United States Patent [19]
Borchardt

[11] Patent Number: 5,467,563
[45] Date of Patent: Nov. 21, 1995

[54] DEFORMABLE SEALING DEVICE FOR A GAP BETWEEN THE EDGE OF A WALL OPENING AND THE BACK WALL OF A VEHICLE DOCKING AT THE WALL OPENING

[75] Inventor: Horst Borchardt, Wennigsen, Germany

[73] Assignee: Alten Gerätebau GmbH, Wennigsen, Germany

[21] Appl. No.: 167,636

[22] Filed: Dec. 14, 1993

[30] Foreign Application Priority Data

Dec. 14, 1992 [DE] Germany ............ 42 42 088.1

[51] Int. Cl.⁶ .................................... E04H 14/00
[52] U.S. Cl. ..................................... 52/173.2
[58] Field of Search ............... 52/173.2; 160/40, 160/56, 57, 58.1; 14/71.5; 49/475.1, 480.1, 483.1, 504, 505

[56] References Cited

U.S. PATENT DOCUMENTS

| | | | |
|---|---|---|---|
| 3,216,433 | 11/1965 | D'Azzo | 52/173.2 X |
| 3,322,132 | 5/1967 | Rieder et al. | 52/173.2 X |
| 3,352,314 | 11/1967 | Frommelt et al. | 52/173.2 |
| 3,461,627 | 8/1969 | Conger | 52/173.2 |
| 3,538,655 | 11/1970 | Frommelt et al. | 52/173.2 |
| 3,638,667 | 2/1972 | Frommelt et al. | 52/173.2 |
| 4,495,737 | 1/1985 | Alten | 52/173.2 |
| 4,785,594 | 11/1988 | Alten | 52/173.2 |
| 4,825,606 | 5/1989 | Alten | 52/173.2 |
| 5,195,285 | 3/1993 | Alten | 52/173.2 |

FOREIGN PATENT DOCUMENTS

| | | |
|---|---|---|
| 8600773 | 5/1986 | Germany. |
| 4111367 | 3/1992 | Germany. |
| 590395 | 8/1977 | Switzerland. |

OTHER PUBLICATIONS

Mitarbeit von Dieter Muhs et al.; Maschinen elemente; 1976; pp. 218–221.

*Primary Examiner*—David M. Purol
*Attorney, Agent, or Firm*—Robert W. Becker & Associates

[57] ABSTRACT

A deformable sealing device for a gap between a wall opening of a building wall and a back wall of a vehicle docking at the wall opening has a flap-shaped deformable skirt for receiving loads by the back wall of the vehicle docking at the wall opening. The skirt has an upper transverse portion and two vertical strips that are arranged parallel to vertical sides of the wall opening. A cover is connected between the upper transverse portion and the building wall. The vertical strips have vertically extending outer edges with stiffened edge profiles. First guide members are connected between the stiffened edge profiles and the building wall, whereby the first guide members extend at a slant relative to the vertical. Each first guide member is a first tension spring with windings that are directly adjacent to one another.

12 Claims, 5 Drawing Sheets

DEFORMABLE SEALING DEVICE FOR A GAP BETWEEN THE EDGE OF A WALL OPENING AND THE BACK WALL OF A VEHICLE DOCKING AT THE WALL OPENING

BACKGROUND OF THE INVENTION

The present invention relates to an elastically deformable sealing device of a gap between the edge of a wall opening and the back wall of a vehicle docking at the wall opening. The sealing device has a flap-shaped deformable skirt with deformable vertical strips arranged on both sides of the wall opening and with an upper transverse portion in the area of the upper ends of the vertical strips arranged in front of those strips, whereby laterally outwardly positioned guide members engage the vertical strips that are connected with their rearward end at the building wall and extend in a slanted manner.

In these sealing devices the skirt must adapt to the shape or contour of the back wall of the vehicle docking at the building wall. Furthermore, the skirt must be elastically deformable in the direction toward the building when the skirt, upon load exerted by the vehicle, is displaced in the direction toward the building. For these reasons the guide members which are rigid or optionally shortenable in the longitudinal direction have springs which allow the displacement of the skirt only against the force of the springs.

However, these skirts supported by guide members have the disadvantage that laterally acting forces result in a premature wear of the skirt and the guide members.

Furthermore, it is known to connect the skirts to support bodies which are comprised of a plurality of pressure springs arranged above one another. These support bodies are able to give to lateral forces; however, the support body formed by the springs is relatively stiff so that a deformation of the sealing device in the direction toward the building requires considerable forces which may result in damage to the skirt.

It is therefore an object of the present invention to improve a sealing device of the aforementioned kind such that it is easily deformable in direction toward the building and at a slant to that direction and is accordingly easily adaptable to the back wall of a vehicle.

SUMMARY OF THE INVENTION

The deformable sealing device for a gap between a wall opening of a building wall and a back wall of a vehicle docking at the wall opening according to the present invention is primarily characterized by:

A flap-shaped deformable skirt for receiving loads by the back wall of the vehicle docking at the wall opening, the skirt comprising an upper transverse portion and two vertical strips that are arranged parallel to vertical sides of the wall opening;

A cover connected between the upper transverse portion and the building wall;

The vertical strips having vertically extending outer edges with stiffened edge profiles;

First guide members connected between the stiffened edge profiles and the building wall, the first guide members extending at a slant relative to the vertical; and Wherein each first guide member is a first tension spring with windings that are substantially directly adjacent to one another.

In a preferred embodiment of the present invention, the deformable sealing device further comprises second guide members connected between an upper edge of the upper transverse portion and the building wall, the second guide members extending at a slant relative to the vertical.

Preferably, the upper transverse portion comprises a transverse beam and the second guide members are connected to the transverse beam for lifting the transverse beam together with the upper transverse portion and the cover.

Advantageously, a first end of the second guide member is fixedly connected to the building wall and a second end of the second guide member is fixedly connected to the transverse beam. Preferably, each second guide member is a second tension spring with windings that are substantially directly adjacent to one another.

Expediently, a first end of the first tension spring is fixedly connected to the building wall and a second end of the first tension spring is fixedly connected to the stiffened edge profiles.

In another preferred embodiment of the present invention, the skirt further comprises flap-shaped flexible side portions for laterally sealing the sealing device at the wall opening, the side portions connected between the vertical edges of the vertical strips and the building wall. Preferably, each first tension spring extends in a slanted downward direction from the building wall and is connected to a lower end of each stiffened profiled edge for stretching the side portions.

Advantageously, two of the first tension springs are connected to each of the stiffened edge profiles, whereby the two first tension springs extend parallel to one another so as to form a parallelogram guiding system for the stiffened edge profile.

Expediently, the first tension spring is rigid for receiving axial pressure forces, is stretchable when acted on by pulling forces, and is bendable when acted on by lateral forces.

The gist of the present invention is providing guide members in the form of a tension spring with windings that are positioned substantially directly adjacent to one another.

Such guide members have the advantage that in the longitudinal direction they are rigid with respect to pressure, but are easily deformable in a transverse direction when respective forces act on the skirt.

BRIEF DESCRIPTION OF THE DRAWINGS

This object, and other objects and advantages of the present invention, will appear more clearly from the following specification in conjunction with the accompanying drawings, in which.

Description of Preferred Embodiments

Figure 1:
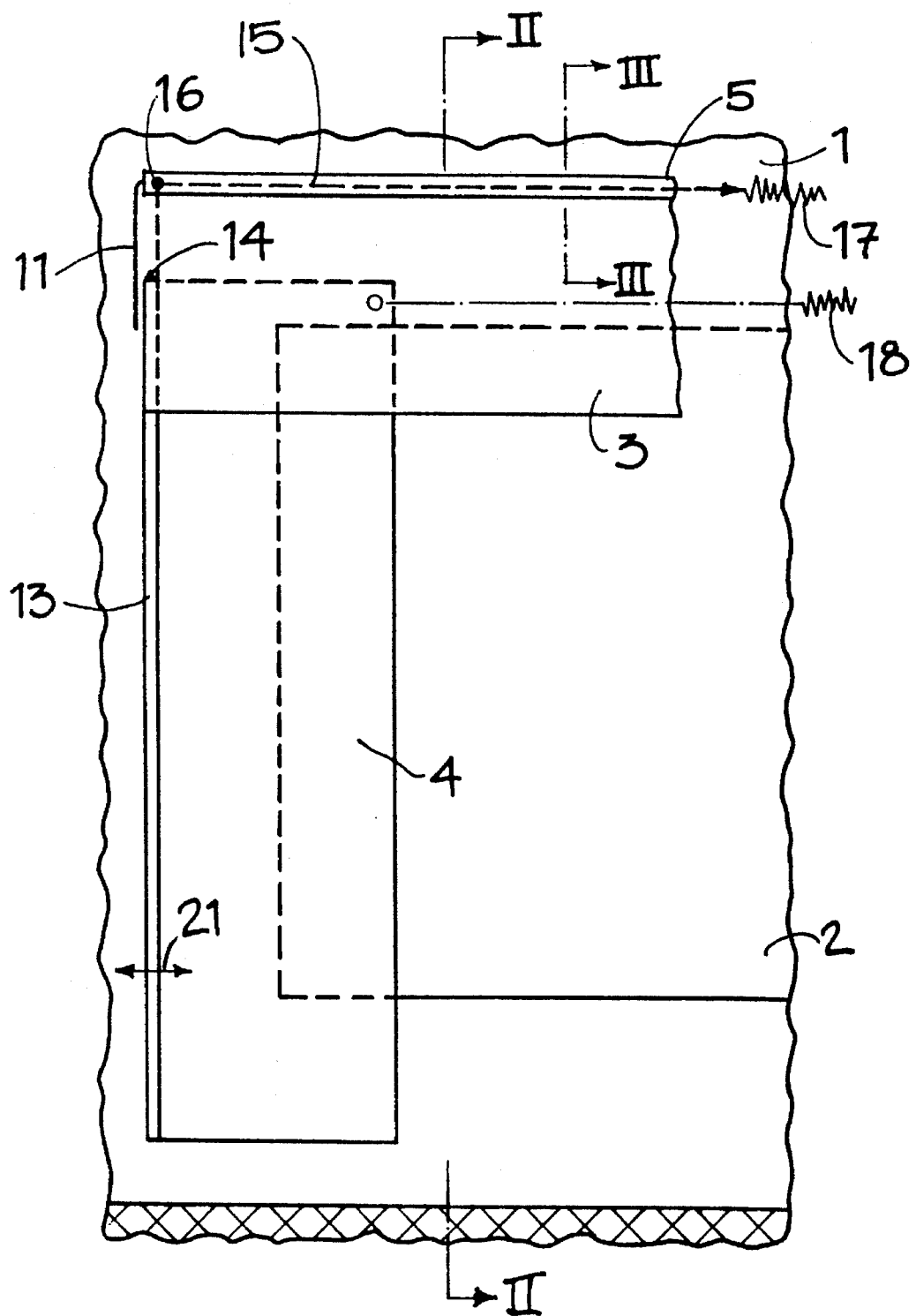
FIG. 1 shows in a front view the left half a deformable sealing device for a gap between the edge of a building wall opening and the backwall of a vehicle docking at the wall opening.

The present invention will now be described in detail with the aid of several specific embodiments utilizing FIGS. 1 through 4.

The building wall 1 of the building, for example, a warehouse, has a wall opening 2 that can be closed by a sectional gate. In order to seal the gap between the edge of this wall opening and the back wall of a vehicle docking at the wall opening, a deformable sealing device according to the drawings of the present invention is provided in order to be able to perform loading and unloading without impairment by weather conditions.

At a distance from the building wall 1, a deformable skirt is provided which is comprised of an upper transverse portion 3 and two vertically extending strips 4 positioned on both sides of the wall opening 2. The upper transverse portion 3 which is positioned in front of the strips 4 is supported like a curtain and is connected with its upper end with a bending-resistant transverse beam 5 that is supported by upwardly extending stays 6.

A metal profile 7 is connected to the transverse beam 5 which serves for supporting (fastening) the transverse portion 3 and a cover 8 which, with its rearward end, is connected to the building wall 1.

The two stays 6 which are arranged within the area of the ends of the transverse portion 3 are rigidly connected with the transverse beam 5. However, the stays 6 are pivotable at their lower end at a gliding member 28 and are thus movable in the direction of arrow 9. The gliding member 28 may be connected in vertical guides 10 connected to the building wall 1 in order to perform lifting movements. Accordingly, the transverse portion 3 with the transverse beam 5 and the cover 8 can perform lifting movements which may be needed, for example, for respectively high vehicles or due to lifting movements of container-carrying trucks.

On both lateral ends of the cover 8 overhangs 11 are provided in the form of freely suspended flaps.

For the evaluation of the invention the side portions 12 that seal the sealing device in the outward direction are of special importance. They are connected with one edge to the building wall 1 and with the other edge to a vertically extending edge profile 13 that supports the vertical strips 4. Accordingly, the side portions 12 bridge in a sealing manner the distance between the building wall 1 and the lateral (outer) edges of the strips 4. The parts 4, 12, as well as the parts 3, 8, 11, are made of a flap-like foil material that can adapt to the contour of the vehicle, but is pull and tear-resistant. For this purpose, a fabric that is coated with rubber or plastic material may be used.

Figure 2:
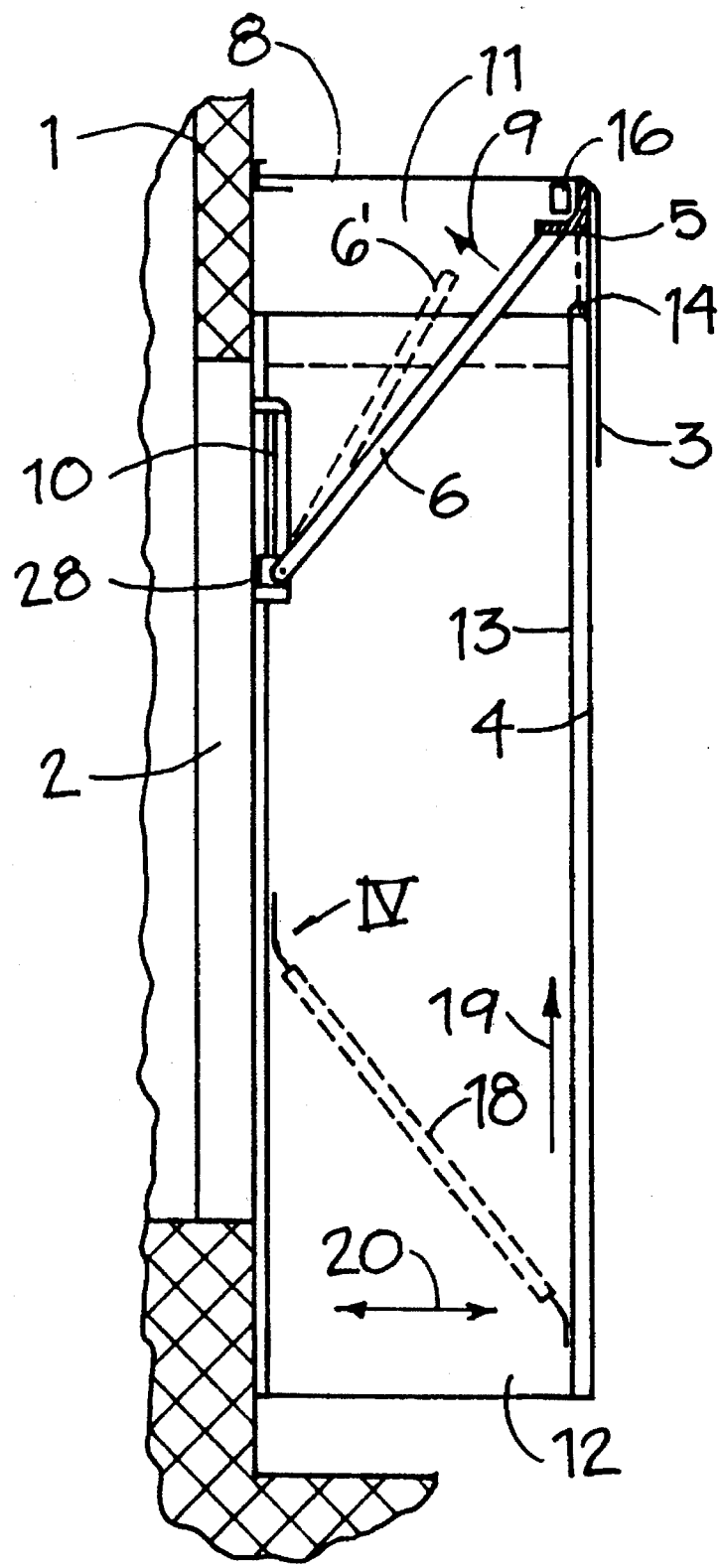
FIG. 2 shows a section along line II—II of FIG. 1.

FIGS. 1 and 2 also show that the two strips 4, the metallic edge profile 13, and the side portions 12 end at a distance below the cover 8 and the transverse beam 5. The free space is however covered by the upper transverse portion 3 and at the two sides by the overhangs 11.

The side portions 12 are not held by supporting guide members that are connected to the building wall 1, but are held by cables 15 that engage the side portions 12 in the area of the edge profiles 13 indicated at 14, the cables 15 being guided through the transverse beam 5, guided about the rollers or pulleys 16 and connected to one another by a tension spring 17 that is arranged in a hidden manner. Additionally, the inner corners of the strips 4 are connected by an elastic pull. However, it is also possible to support the strips 4 via upwardly oriented elastic pulls that are connected to the transverse beam 5.

In the area of its lower end of the edge profile 13 is connected to a very tightly wound coil spring 18 that is upwardly slanted at an angle of 30° to 60° relative to the vertical. The coil spring 18 is fixedly connected with its upper end to the building wall 1.

Since with the suspension with the aid of the cable 15 a support force, respectively, a pulling force in the direction of arrow 19, especially in the longitudinal direction of the edge profile 13 results, a corresponding force acts on the lower end of the coil spring 18, while simultaneously a pulling force 20 is introduced into the side portions 12. However, the fabric-reinforced material of the side portions 12 does not yield to such pulling forces. This means that in the rest position of the sealing device of the present invention, a stretched contour of the side portions is provided and maintained. The slantedly oriented coil springs 18 which are pressure-resistant in the longitudinal direction, act as a stay that provides a spreading member for the side portions 12 and thus ensure the normal (rest) position according to the drawings. A further special feature of the mentioned coil spring 18 is that it can counteract lateral forces by elastically bending. Lateral forces, which commonly result when a vehicle is docking, thus result in an elastic deformation of the entire skirt inclusive side portions 12. When the vehicle is removed from the sealing device, the coil spring 18 returns into its stretched position and thus stretches the side portions 12.

Furthermore, due to the bending deformation of the coil spring 18 lateral movement of the edge profiles 13 in the direction of double arrow 21 may occur, most likely in the lower portion, but also in the upper portion of the strip 4 since the edge profile 13 is also able to follow a corresponding deflection in the upper portion due to the elasticity of the spring 17. When a comparatively great deformation of the strip, respectively, a correspondingly great load of the sealing device occurs, the coil spring 18 with tension spring properties may even bend under such loads. When the load ceases, the spring then resumes its stretched position by returning the sealing device, especially, the side portions 12, into the original (rest) position.

The spreading device in the form of the coil spring 18 thus has practically no supporting function with respect to the weight load resulting from the strips 4 and the side portions 12. The necessary forces are practically provided by the tension spring 17.

Instead of the spreading device, respectively, stay, in the form of a coil spring 18, the coil spring 18 may also be used as a guide member, whereby, for example, at the edge profiles two slantedly oriented coil springs 18 are provided in the form of a parallelogram guiding system with slanted, upwardly oriented guide members.

In this context, it is also possible to fixedly connect the coil spring 18 with its ends to the neighboring parts, i.e., with one end to the building wall 1 and with the other end to the edge profile 13. In this case the load exerted on the skirt results in corresponding deformations of the coil springs 18 by bending and/or lateral buckling. Independent of the way in which the deformation of the coil spring 18 occurs, it will always return into its original stretched shape.

The invention may also be used for such skirts in which the skirt is supported by a U-shaped frame with the strips 4 connected to vertical legs and the upper transverse portion 3 are connected to the upper stay of the frame. It is understood that under these conditions the forward ends of the coil springs 18 must engage the legs of the frame in order to ensure support and guidance of the U-shaped frame.

Figure 2A:
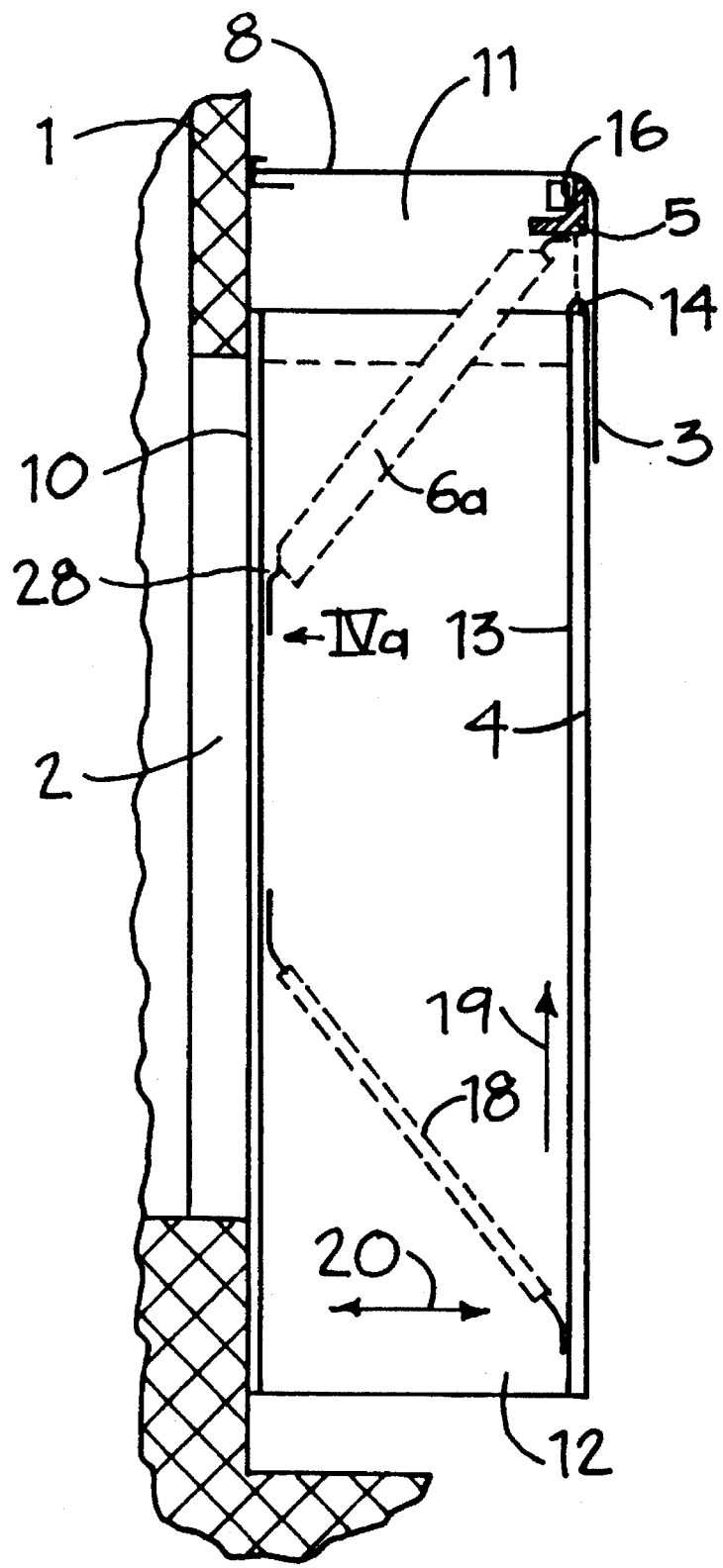
FIG. 2a shows, in a representation according to FIG. 2, a further embodiment with the second guide member being in the form of a tension spring.
Figure 3:
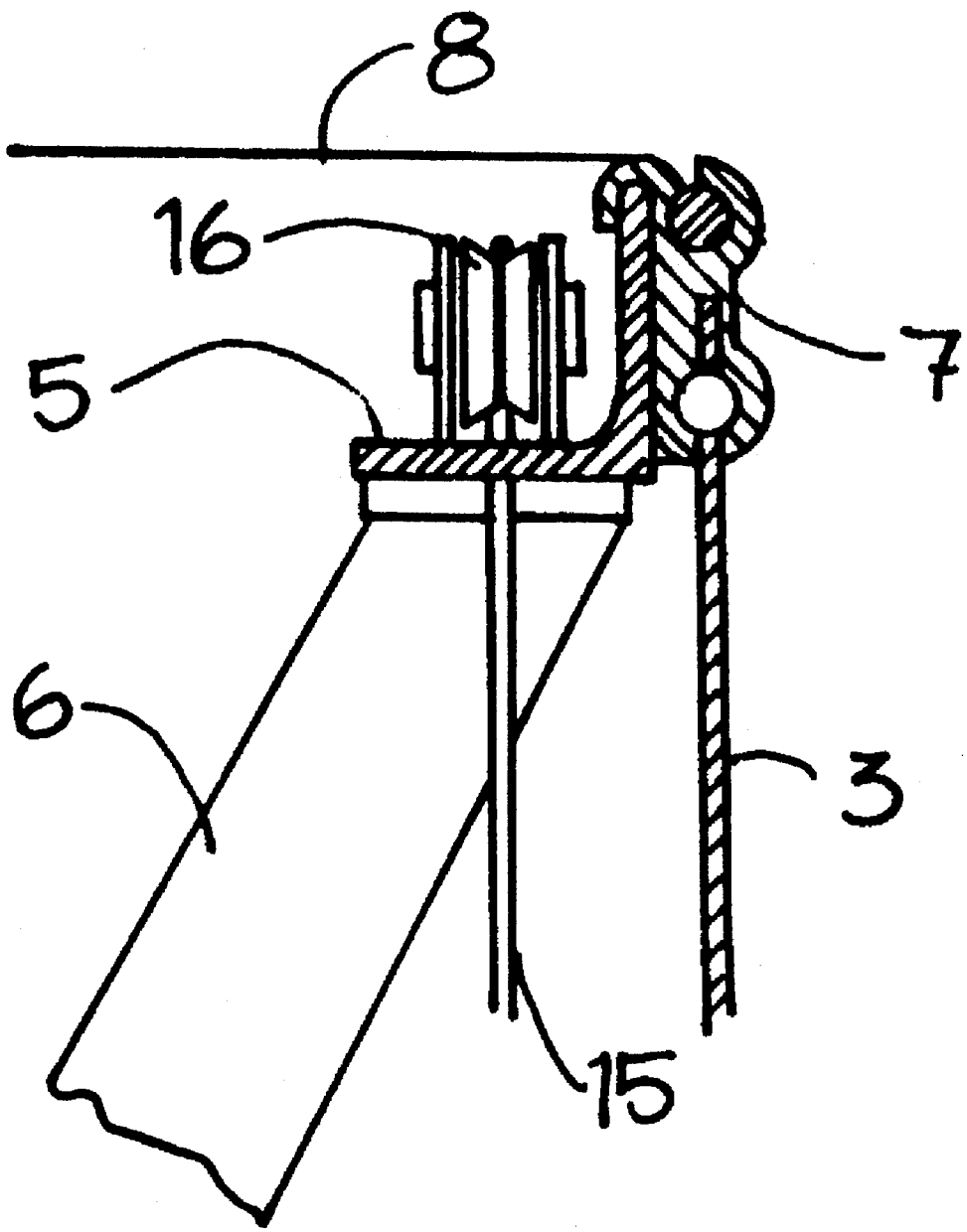
FIG. 3 shows a part-sectional view along the line III—III of FIG. 1.
Figure 4:
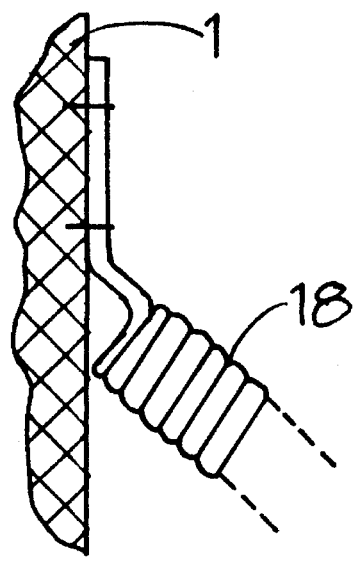
FIG. 4 shows a detail of FIG. 2 at IV.
Figure 4A:
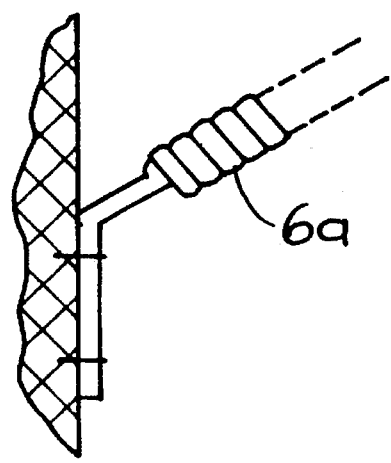
FIG. 4a shows a detail of FIG. 2a at IVa.

It is furthermore possible that the stay 6 is in the form of a coil spring 6a whereby in this case the use of pivot joints is obsolete (FIGS. 2A and 4a).

The present invention is, of course, in no way restricted to the specific disclosure of the specification and drawings, but also encompasses any modifications within the scope of the appended claims.

What I claim is:

1. A deformable sealing device for a gap between a wall opening of a building wall and a back wall of a vehicle docking at the wall opening, said sealing device comprising:

a flap-shaped deformable skirt for receiving loads by the back wall of the vehicle docking at the wall opening, said skirt comprising an upper transverse portion and two vertical strips that are arranged parallel to vertical sides of the wall opening;

a cover connected between said upper transverse portion and the building wall;

said vertical strips having vertically extending outer edges with stiffened edge profiles;

first guide members connected between said stiffened edge profiles and the building wall, said first guide members extending at a slant relative to the vertical; and wherein each said first guide member is a first tension spring with windings that are substantially directly adjacent to one another, such that said first tension spring is pressure resistant and rigid in a longitudinal direction of said first spring, stretchable by pulling forces acting in the longitudinal direction, and bendable when acted on by lateral forces.

2. A deformable sealing device according to claim 1, further comprising second guide members connected between an upper edge of said upper transverse portion and the building wall, said second guide members extending at a slant relative to the vertical.

3. A deformable sealing device according to claim 2, wherein said upper transverse portion comprises a transverse beam and wherein said second guide members are connected to said transverse beam for lifting said transverse beam together with said upper transverse portion and said cover.

4. A deformable sealing device according to claim 3, wherein a first end of said second guide member is fixedly connected to the building wall and a second end of said second guide member is fixedly connected to said transverse beam.

5. A deformable sealing device according to claim 4, wherein each said second guide member is a second tension spring with windings that are substantially directly adjacent to one another.

6. A deformable sealing device according to claim 1, wherein a first end of said first tension springs is fixedly connected to the building wall and a second end of said first tension springs is fixedly connected to said stiffened edge profiles.

7. A deformable sealing device according to claim 1, wherein;

said skirt further comprises flap-shaped flexible side portions for laterally sealing said sealing device at the wall opening, said side portions connected between said outer edges of said vertical strips and the building wall; and each said first tension spring extends in a slanted downward direction from the building wall and is connected to a lower end of each said stiffened profiled edge for stretching said side portions.

8. A deformable sealing device according to claim 1, wherein two of said first tension springs are connected to each of said stiffened edge profiles, said two first tension springs extending parallel to one another so as to form a parallelogram guiding system for said stiffened edge profile.

9. A deformable sealing device according to claim 1, wherein said first tension spring is rigid for receiving axial pressure forces, is stretchable when acted on by pulling forces, and is bendable when acted on by lateral forces.

10. A deformable sealing device for a gap between a wall opening of a building wall and a back wall of a vehicle docking at the wall opening, said sealing device comprising:

a flap-shaped deformable skirt for receiving loads by the back wall of the vehicle docking at the wall opening, said skirt comprising an upper transverse portion and two vertical strips that are arranged parallel to vertical sides of the wall opening;

a cover connected between said upper transverse portion and the building wall;

said vertical strips having vertically extending outer edges with stiffened edge profiles;

first guide members connected between said stiffened edge profiles and the building wall, said first guide members extending at a slant relative to the vertical;

wherein each said first guide member is a first tension spring with windings that are substantially directly adjacent to one another; and second guide members connected between an upper edge of said upper transverse portion and the building wall, said second guide members extending at a slant relative to the vertical, each said second guide member being a second tension spring with windings that are substantially directly adjacent to one another.

11. A deformable sealing device for a gap between a wall opening of a building wall and a back wall of a vehicle docking at the wall opening, said sealing device comprising:

a flap-shaped deformable skirt for receiving loads by the back wall of the vehicle docking at the wall opening, said skirt comprising an upper transverse portion and two vertical strips that are arranged parallel to vertical sides of the wall opening;

a cover connected between said upper transverse portion and the building wall;

said vertical strips having vertically extending outer edges with stiffened edge profiles;

first guide members connected between said stiffened edge profiles and the building wall, said first guide members extending at a slant relative to the vertical;

wherein each said first guide member is a first tension spring with windings that are substantially directly adjacent to one another; and each said first tension spring extends in a slanted downward direction from the building wall and is connected to a lower end of each said stiffened profiled edge.

12. A deformable sealing device for a gap between a wall opening of a building wall and a back wall of a vehicle docking at the wall opening, said sealing device comprising:

a flap-shaped deformable skirt for receiving loads by the back wall of the vehicle docking at the wall opening, said skirt comprising an upper transverse portion and two vertical strips that are arranged parallel to vertical sides of the wall opening;

a cover connected between said upper transverse portion and the building wall;

said vertical strips having vertically extending outer edges with stiffened edge profiles;

first guide members connected between said stiffened edge profiles and the building wall, said first guide members extending at a slant downwardly relative to the vertical;

wherein each said first guide member is a first tension spring with windings that are substantially directly adjacent to one another; and second guide members connected between an upper edge of said upper transverse portion and the building wall, said second guide members extending at a slant upwardly relative to the vertical.

* * * * *